C. COLLINS.
Coffee-Pots.
No. 151,008. Patented May 19, 1874.
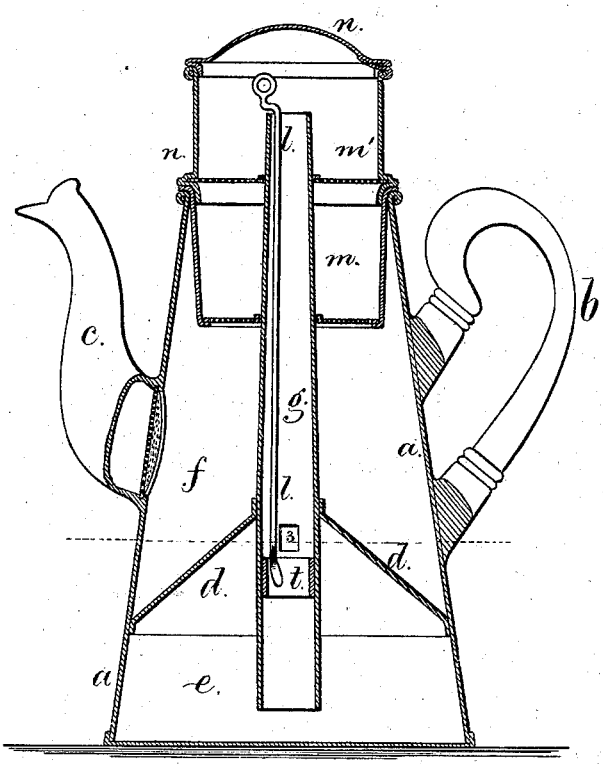
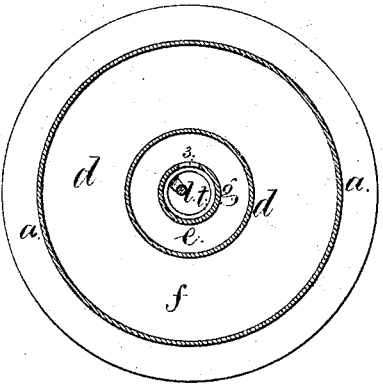
Witnesses,
Chas H Smith
Harold Serrell
Inventor
Charles Collins
per Lemuel W. Serrell
atty

UNITED STATES PATENT OFFICE.

CHARLES COLLINS, OF BROOKLYN, NEW YORK.

IMPROVEMENT IN COFFEE-POTS.

Specification forming part of Letters Patent No. 151,008, dated May 19, 1874; application filed March 21, 1874.

*To all whom it may concern:*

Be it known that I, CHARLES COLLINS, of Brooklyn, in the county of Kings and State of New York, have invented an Improvement in Coffee-Pots, of which the following is a specification:

Coffee-pots have been made with two separate vessels and a tube passing from the lower vessel up into the upper one. The lower vessel receives water that is heated, and the upper vessel contains a receptacle for the ground coffee; a cock between the two vessels is also employed to allow steam to pass to the coffee before water is forced up to the same.

My present invention is made for simplifying the construction of the coffee-pot, and for keeping the coffee-extract hot without boiling the same.

I make use of a conical diaphragm, separating the coffee-pot into two chambers. The lower one is adapted to receive water only, and from the upper one the pouring-spout extends. The coffee is received into a removable basket or holder, and a pipe passes up from near the bottom of the pot to above the coffee-holder, and in this pipe is an opening near the said diaphragm with a sliding valve. When this opening is not closed by the valve, the steam generated by boiling the water that is placed in the lower chamber escapes and permeates the coffee, and when the extract is to be made, this opening is to be closed by the valve, and the pressure of the confined steam throws the boiling water up the tube, and it falls upon the coffee, and, passing through the same, extracts its soluble portion. The coffee in the upper chamber can be poured from the spout, or it can be kept in a heated condition by heat imparted to the water that remains in the bottom of the lower receptacle.

In the drawing, Figure 1 is a vertical section of the pot; and Fig. 2 is a sectional plan of the pot, tube, and valve.

The coffee-pot $a$ is made with handle $b$ and spout $c$, as usual, but within it is the conical diaphragm $d$, that separates the pot into the water-chamber $e$ and extract-chamber $f$. $g$ is a tube passing through the diaphragm, and reaching to about half an inch from the bottom of the pot, and this tube rises into the coffee-holding receptacle or basket $m$ below the removable cover $n$. Within the tube $g$ is a valve, $t$, operated by a rod, $l$, by which the opening 3 in this tube can be closed when the extract is to be made, in which case the accumulation of steam-pressure causes the hot water to rise and flow over the upper end of the tube $g$ and fall upon the coffee, extracting its soluble material, and passing down into the chamber $f$, from which it can be poured by the spout $c$, when desired. The upper perforated receptacle $m'$ serves to distribute the hot water uniformly upon the ground coffee.

I claim as my invention—

The tube $g$, passing through the diaphragm $d$, and containing an opening and valve below the diaphragm, in combination with the removable coffee-holding receptacle, through which the tube $g$ rises, for the purposes and as set forth.

Signed by me this 16th day of March, 1874.

CHARLES COLLINS.

Witnesses:
 GEO. T. PINCKNEY,
 CHAS. H. SMITH.